United States Patent
Chandrasekaran et al.

(10) Patent No.: US 9,819,743 B2
(45) Date of Patent: Nov. 14, 2017

(54) TRANSFER OF SESSION FROM INTERACTIVE DIGITAL SIGN TO MOBILE DEVICE

(71) Applicant: CISCO TECHNOLOGY, INC., San Jose, CA (US)

(72) Inventors: Balachander Chandrasekaran, San Ramon, CA (US); Jagdish Girimaji, Pleasanton, CA (US); Coumara Radja, Los Altos, CA (US); Chris Spain, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 533 days.

(21) Appl. No.: 14/301,226

(22) Filed: Jun. 10, 2014

(65) Prior Publication Data

US 2015/0358410 A1    Dec. 10, 2015

(51) Int. Cl.
*G06F 15/16* (2006.01)
*H04L 29/08* (2006.01)
*H04W 4/00* (2009.01)

(52) U.S. Cl.
CPC .......... *H04L 67/141* (2013.01); *H04L 67/146* (2013.01); *H04L 67/148* (2013.01); *H04W 4/005* (2013.01)

(58) Field of Classification Search
CPC ..... H04L 67/141; H04L 67/146; H04W 4/005
See application file for complete search history.

(56) References Cited

U.S. PATENT DOCUMENTS

| | | | |
|---|---|---|---|
| 8,820,575 B2 | 9/2014 | Nicholson | |
| 2008/0057867 A1* | 3/2008 | Trappeniers | H04L 6/14 455/41.2 |
| 2011/0219105 A1* | 9/2011 | Kryze | G06F 15/16 709/223 |
| 2013/0212286 A1* | 8/2013 | Krishnakumar | H04L 67/148 709/227 |
| 2014/0085179 A1 | 3/2014 | Krig et al. | |
| 2014/0129834 A1* | 5/2014 | Brill | H04L 9/3226 713/168 |
| 2014/0279031 A1 | 9/2014 | Mersky | |
| 2015/0237031 A1* | 8/2015 | Neuman | H04L 63/08 713/176 |
| 2015/0237207 A1* | 8/2015 | Ordille | G06F 21/45 379/204.01 |
| 2015/0349971 A1* | 12/2015 | Sinha | H04L 63/0428 370/260 |

* cited by examiner

*Primary Examiner* — Viet Vu
(74) *Attorney, Agent, or Firm* — Cindy Kaplan

(57) ABSTRACT

In one embodiment, a method includes creating at a network device, a user session with an interactive digital sign, generating a session tag for the user session, wherein the session tag is configured for input at a mobile device, transmitting the session tag to the interactive digital sign, and continuing at the network device, the user session with the mobile device. An apparatus and logic are also disclosed herein.

20 Claims, 5 Drawing Sheets

TRANSFER OF SESSION FROM INTERACTIVE DIGITAL SIGN TO MOBILE DEVICE

TECHNICAL FIELD

The present disclosure relates generally to communication networks, and more particularly, to transferring a communication session from a public interactive digital sign to a mobile device.

BACKGROUND

The popularity of digital signage is growing at a rapid pace. Many public areas use electronic signs for advertisement or as an information source. Adding interactivity to a digital sign opens up new possibilities for both businesses and consumers.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
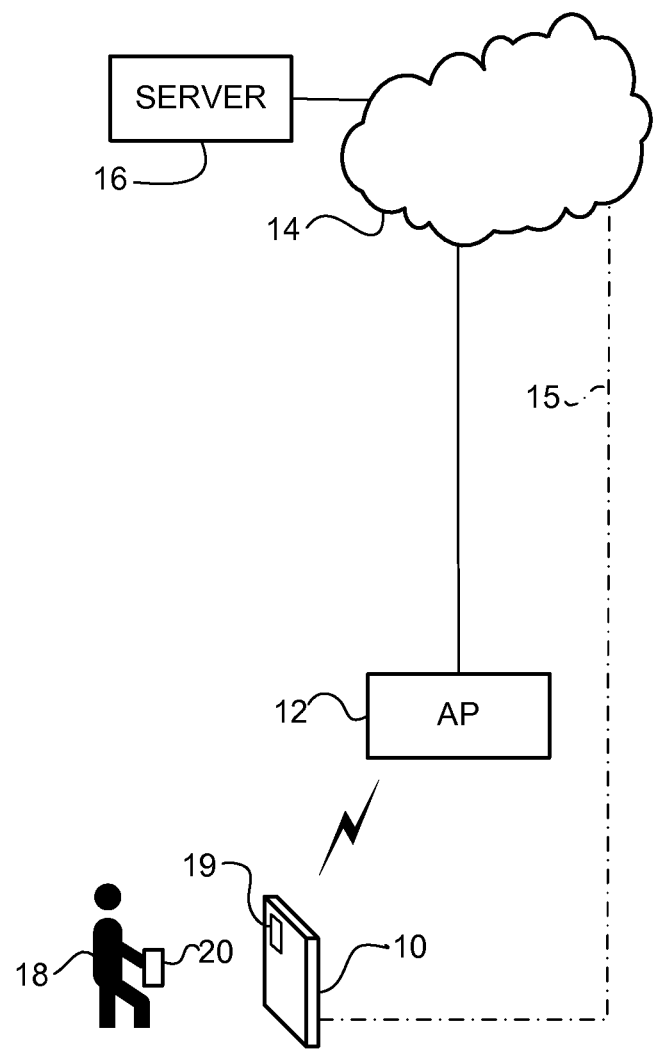
FIG. 1 illustrates an example of a network in which embodiments described herein may be implemented.

In one embodiment, a method generally comprises creating at a network device, a user session with an interactive digital sign, generating a session tag for the user session, wherein the session tag is configured for input at a mobile device, transmitting the session tag to the interactive digital sign, and continuing at the network device, the user session with the mobile device.

In another embodiment, an apparatus generally comprises a processor for receiving user input at an interactive digital sign in a user session with a server, transmitting a request to transfer the user session to a mobile device, and receiving a session tag associated with the user session. The apparatus further comprises memory for storing the session tag. The session tag is configured for input at the mobile device to transfer the user session from the interactive digital sign to the mobile device.

In yet another embodiment, a method generally comprises receiving a session tag at a mobile device, the session tag available from an interactive digital sign and identifying a user session between the interactive digital sign and a server, contacting the server at the mobile device using the session tag, and continuing at the mobile device, the user session with the server.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Interactive digital signs (also referred to as interactive digital signage (IDS), interactive display, interactive digital display, interactive touchscreen, public interactive display, etc.) allow users to navigate to specific information or content that is most pertinent to them. Content may be displayed in various locations to provide, for example, information on products or services, maps, directories, advertisements, menus, schedules, or other information. Locations may include, for example, shopping centers, malls, stores, restaurants, airports, train stations, museums, convention centers, stadiums, arenas, recreation centers, medical centers, manufacturing facilities, city centers, amusement parks, or any other location. Enterprises may use the interactive displays to engage guests (customers, consumers, users, end users). Interactive digital signs may provide an unlimited amount of information to users, and may even be used in transactions, such as purchases, payments, or billing services. With conventional IDS, the interactive experience is limited to participation at the interactive display.

The embodiments described herein provide for the transfer of dynamic data from a public interactive digital sign (IDS) to a mobile device. In one or more embodiments, an IDS experience is transferred to a mobile device using a dynamic tag on a per user session basis, thereby providing seamless transfer of the IDS experience. The customer experience is enhanced by maintaining the user session throughout the transfer. As described in detail below, end users of the public IDS may transfer their interactive session context to their mobile device to continue the interactive session initiated at the IDS.

Referring now to the drawings, and first to FIG. 1, an example of a network in which embodiments described herein may be implemented is shown. For simplification, only a small number of network devices are shown. The network shown in FIG. 1 includes an interactive digital sign (IDS) 10 in wireless communication with access point (AP) 12. The AP 12 is in communication with a server (back end device) 16 via network 14. The network 14 may include one or more networks (e.g., wireless network, local area network, metropolitan area network, wide area network, virtual private network, enterprise network, Internet, intranet, radio access network, public switched network, or any other network). The data path between the AP 12 and server 16 may include any number or type of network devices that facilitate passage of data over the network (e.g., routers, switches, gateways).

In one embodiment, the IDS 10 and AP 12 communicate in a wireless network via antennas and are configured to perform wireless communication according to a wireless network communication protocol such as IEEE 802.11/WiFi, for example. The wireless network may include any number of APs 12, which may serve any number of interactive displays 10. The IDS 10 may also comprise a wired interface (e.g., Ethernet interface) for wired communication with the network 14 (via link or data path 15) rather than wireless communication with the AP 12. There may be any number of network devices located in the data path between the IDS 10 and server 16.

One or more users 18 may interact with the IDS 10. In the example shown in FIG. 1, user 18 has a mobile device 20 (also referred to as a wireless device, station, user device, client, client device, or endpoint). The mobile device 20 may be any suitable equipment that supports wireless communication, including for example, a cellular phone, tablet, laptop, personal digital assistant, portable computing device, multimedia device, and the like. As described below, the mobile device 20 is operable to communicate with the server 16 via a cellular network or wireless network.

The server 16 may be any network device or group of network devices operable to communicate with the IDS 10 and mobile device 20. The server 16 may include one or more databases comprising information (e.g., directories, maps, product or service information, advertisements, billing data, user data, etc.) that may be provided to the user 18 in a communication session. As described below, the server 16 may be configured to assign a session identifier to the communication session initiated by the user 18 at the interactive display 10 and generate a unique tag for the session.

The public IDS 10 may be any type of interactive electronic device operable to communicate with the server 16. The term 'public IDS' as used herein refers to any type of interactive display that can be accessed by users in an open (non-private) forum. For example, the IDS 10 may be in a public shopping mall and any consumer may interact with the device and create a session. The public IDS 10 may also be located in a private environment (e.g., corporation, school) in which a limited number of people have access to the device, but the session created by each user is public to all those that have access to the IDS.

The IDS 10 may comprise one or more screens configured to display content received from the server (content source) 16. One or more screens may comprise, for example, an LCD (liquid crystal display) screen, LED (light emitting diode) screen, plasma display, projected image screen (rear projection screen, front projection screen), or any other suitable device. One or more screens may display information on products or services, special offers, messages, and the like.

In one embodiment, the IDS 10 comprises a touchscreen displaying a graphical user interface (GUI) for receiving input from the user 18. The IDS 10 may also include other input devices (e.g., button or other mechanism, mouse, microphone, etc.) for receiving user input. In one embodiment, the IDS 10 includes a keyboard (e.g., touchscreen or keys) for use in entering user information (e.g., email address, username).

The IDS 10 may comprise a client (e.g., Interactive Experience Client) in communication with a manager (e.g., Interactive Experience Manager), for example. The client may include a web browser and be configured to support peripherals including touchscreens, scanners, speakers, etc.

The IDS 10 preferably displays directions for the user 18 on how to transfer an active user session to their mobile device 20. Selectable icons (images, text) may also be displayed on the IDS 10 for use in transferring the session. For example, the IDS 10 may display an icon or message (e.g., 'Transfer') that can be selected by the user to initiate the generation and display of a tag 19 associated with the session. The IDS 10 displays the tag 19 associated with the user session for use in transferring the session to the mobile device 20.

As described in detail below with respect to the flowcharts of FIGS. 3, 4, and 5, the user 18 initiates an interactive communication session with the IDS 10 and then transfers the active session to their mobile device 20. The user 18 may, for example, want to move away from the IDS 10 while continuing the session or further personalize and complete a private session (e.g., to make a purchase, reservation, or other secure transaction that involves private information). The mobile device 20 communicates with the server 16 and continues the user session originally initiated between the interactive display 10 and server.

The mobile device 20 may communicate with the server 16 through the AP 12 (e.g., via a WiFi interface) or through a cellular network (e.g., via a 3G/4G radio interface), or both. For example, the user 18 may initially communicate with the server 16 over a 3G interface and be presented with an option to connect to the wireless network via WiFi for wayfinding.

In one embodiment, when the user 18 initiates a session at the interactive display 10, a unique session identifier (ID) is created for the user session. This session ID is persisted at the server 16. When the user 18 is finished using the interactive display 10 and ready to transfer the experience to the mobile device 20, a unique tag 19 is generated based on the session ID of the user. The session tag 19 may comprise, for example, a QR (Quick Response) code, NFC (Near Field Communication) tag, URI (Uniform Resource Identifier), signal (e.g., for use with airdrop), or other identifier for use in contacting the appropriate server and identifying the user session originated between the IDS 10 and server 16. The session tag may represent the URI to the webserver with the appropriate session ID, for example.

The session tag 19 is used by the mobile device 20 to identify the user session and location of the session that is to be transferred to the mobile device 20. For example, scanning the QR code may launch a browser with the URI containing the session ID, which allows the user to continue from where he left off at the interactive display 10. For NFC enabled devices, NFC allows for the transfer of the web URI containing the session ID and launching of the browser on the NFC enabled mobile device. The session tag 19 may also include information such as certificates or keys needed to continue the session or authenticate/authorize the mobile device 20 with the server 16.

The term 'tag' as used herein may refer to any image, text, code, signal, or other data that may be generated and displayed or transmitted at the interactive device 10 and input (e.g., scanned, typed, wirelessly received) at the mobile device 20 to identify the active communication session between the interactive display 10 and server 16.

It is to be understood that the network shown in FIG. 1 is only an example and that other network topologies or network devices may be used without departing from the scope of the embodiments. For example, as noted above, any number of users 18 may interact with any number of interactive displays 10, which are in communication with one or more servers 16 via wired or wireless communication.

Figure 2:
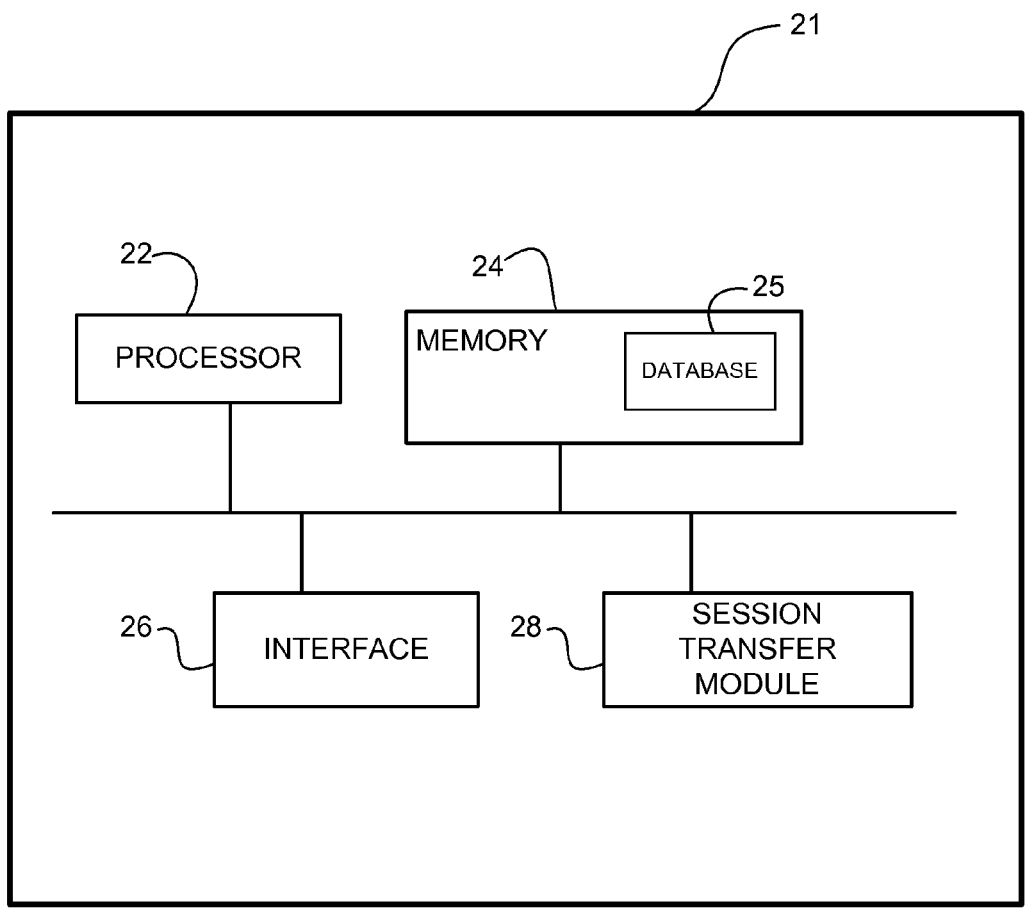
FIG. 2 depicts an example of a network device useful in implementing embodiments described herein.

FIG. 2 illustrates an example of a network device 21 (e.g., interactive display 10, client at IDS, server 16, mobile device 20) that may be used to implement the embodiments described herein. In one embodiment, the network device 21 is a programmable machine that may be implemented in hardware, software, or any combination thereof. The network device 21 includes one or more processor 22, memory 24, and network interface 26. The network device 21 (e.g., IDS 10, server 16) may also include a session transfer module 28 comprising components (e.g., logic, code, databases, or other mechanisms) for use in identifying a communication session and transferring the session from the interactive display 10 to the mobile device 20.

Memory 24 may be a volatile memory or non-volatile storage, which stores various applications, operating systems, modules, and data for execution and use by the processor 22. For example, memory 24 at the server 16 may include a database 25 containing content for display at the IDS 10 or mobile device 20. The database 25 at the IDS 10 or server 16 may store (at least temporarily) one or more session identifiers or session tags 19.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. Logic may also be embodied as software stored on a non-transitory, tangible media operable to perform functions when executed by the processor 22.

The network interface 26 may comprise any number of interfaces (linecards, ports) for receiving data or transmitting data to other devices. The network interface 26 may include, for example, an Ethernet interface at the server 16 for connection to a computer or network, or a wireless interface at the IDS 10 or mobile device 20.

It is to be understood that the network device 21 shown in FIG. 2 and described above is only an example and that different configurations of network devices may be used. For example, the network device 21 may further include any suitable combination of hardware, software, algorithms, processors, devices, components, or elements operable to facilitate the capabilities described herein.

Figure 3:
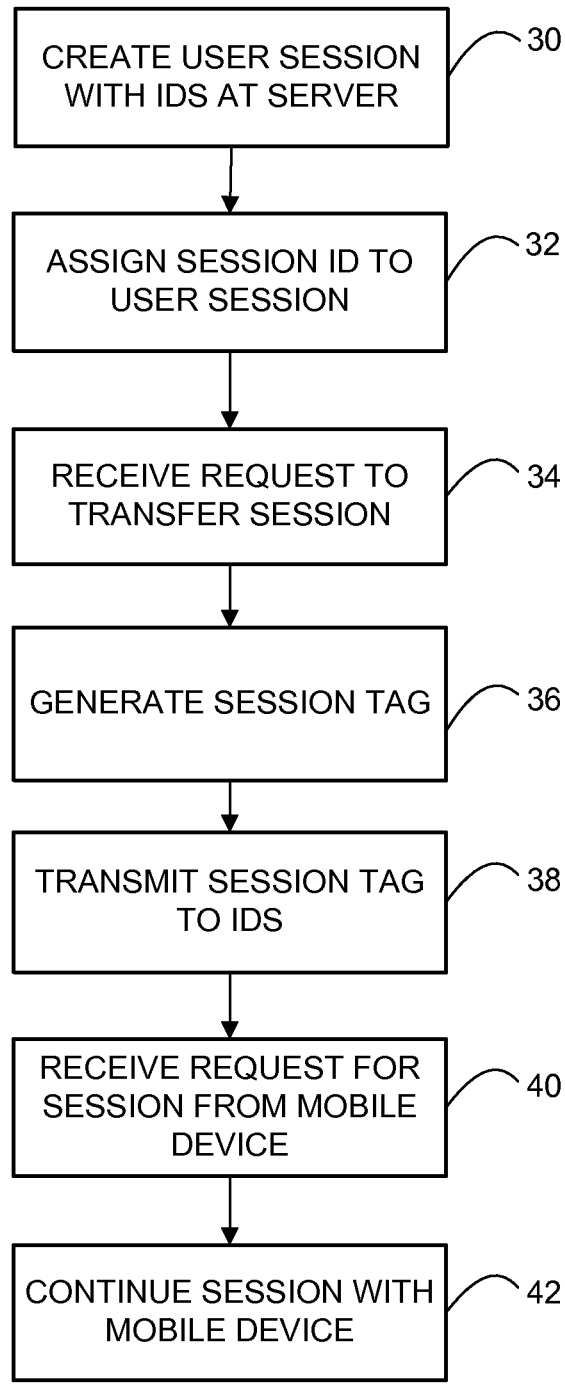
FIG. 3 is a flowchart illustrating an overview of a process at a network device for transferring a user session from an interactive digital sign to a mobile device, in accordance with one embodiment.

FIG. 3 is flowchart illustrating an overview of a process at the server (e.g., backend device) 16 for transferring a session from the IDS 10 to the mobile device 20, in accordance with one embodiment. At step 30, a user session is created between the server 16 and the interactive display 10 (FIGS. 1 and 3). A unique session ID is assigned to the session (step 32). At some point during the session, the user 18 decides that he wants to continue the session on his mobile device 20. The user 18 may, for example, touch a 'Transfer' icon on the screen at the IDS 10. In response to receiving a request from the interactive display 10 for transfer of the session (step 34), the server 16 generates a unique tag 19 based on the session ID (step 36). The server 16 transmits the session tag 19 to the IDS 10 (step 38). The session tag 19 is presented to the user at the IDS 10. The user 18 enters the tag 19 in the mobile device 20 (e.g., scans, types, receives wirelessly). In response to input of the session tag at the mobile device 20, server 16 receives a request for the user session from the mobile device (step 40). The server 16 continues the session with the mobile device 20 (step 42). As described in detail below, there may be security measures in place to prevent another user from attempting to join the same session. For example, the server 16 may timeout the tag at the IDS 10 if the user does not contact the server with his mobile device 20 in a set time interval.

Figure 4:
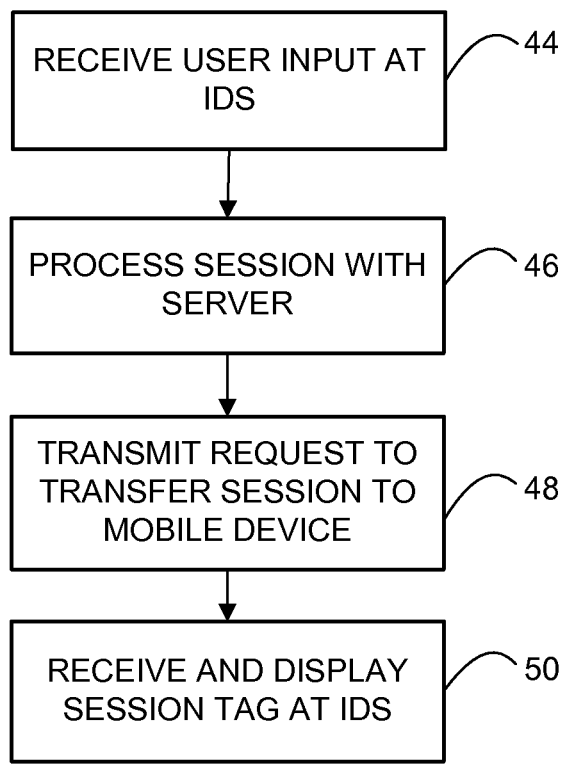
FIG. 4 is a flowchart illustrating an overview of a process at the interactive digital sign for transferring the user session from the interactive digital sign to the mobile device, in accordance with one embodiment.

FIG. 4 is a flowchart illustrating an overview of the session transfer process at the interactive digital sign 10, in accordance with one embodiment. At step 44, user input is received at the IDS 10. The interactive display 10 creates a session with the server 16 and processes the session based on user input (step 46). Upon receiving a request to transfer the session, the interactive display 10 transmits a request for a session tag to the server (step 48). The IDS 10 receives the session tag 19 from the server 16 and displays (or otherwise provides) the tag for use by the mobile device 20 (step 50). As a security measure, the IDS 10 may end the session if there is no activity for a predetermined amount of time.

Figure 5:
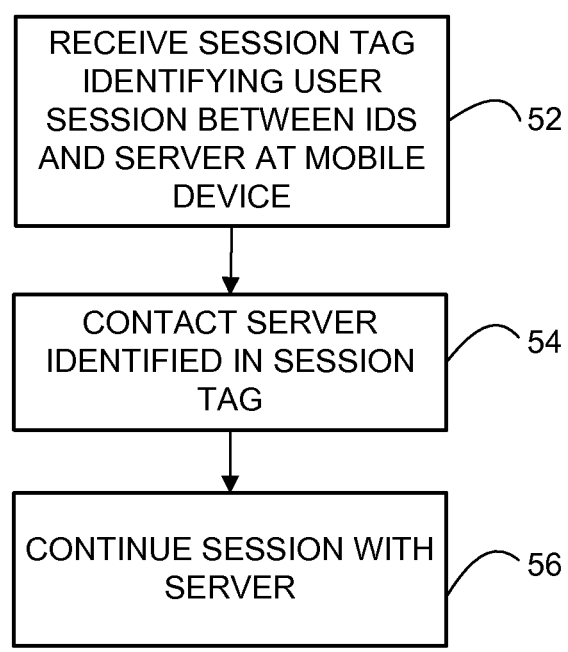
FIG. 5 is a flowchart illustrating an overview of a process at the mobile device for receiving an active communication session from the interactive digital sign, in accordance with one embodiment.

FIG. 5 is a flowchart illustrating a process at the mobile device 20 for transferring the communication session from the interactive display 10 to the mobile device, in accordance with one embodiment. At step 52, a session tag 19 identifying the user session between the interactive display 10 and server 16 is received at the mobile device. The mobile device 20 contacts the server 16 using the session tag to identify the session at the server (step 54). The user session then continues between the mobile device 20 and server 16 (step 56).

It is to be understood that the processes shown in FIGS. 3, 4, and 5, and described above are only examples and that steps may be added, combined, removed, or modified, without departing from the scope of the embodiments.

Referring again to FIG. 1, the following describes an example of a process that may take place after the user 18 initiates interaction with the interactive digital sign 10 (e.g., user presses a start button on the touchscreen of a kiosk). A user session is created between the server 16 and IDS 10 and a session identifier (ID) is assigned to the session. In one example, the session ID is a key comprising a 128 bit hash of a timestamp and kiosk (IDS) number, which is used by the interactive display 10 for the rest of the session in which the user 18 interacts with the display. The user 18 may input information (e.g., username, email, or other information), which may be used by the server in creating the session ID. The session identifier (e.g., hash, timestamp, kiosk number) is stored in the database 25 at the server 16 (FIGS. 1 and 2). If the user 18 provides an email or other user identifier, this may also be stored at the database. Any further interaction between the user 18 and IDS 10 is captured in the database 25 along with the hash as the key to a table in the database.

When the user 18 is ready to transfer the session to his mobile device 20, he selects a transfer option at the interactive display 10. In one example, a QR code is generated (e.g., http://<server host>/<128 bit hashkey>/mobile?=true). A timer may be started at the IDS 10 so that the session is ended within a specified interval (e.g. 15 seconds) if there is no activity at the IDS or the user ends the session by selecting an icon (e.g., 'Done'), which may be displayed next to the QR code, for example. The server 16 may also start a timer (e.g., 30 second timer) to ensure that the session identifier in the hashkey is invalidated if the user does not contact the database to retrieve the session using the QR code http request. Once the user has used the QR code, the interactive display experience based on the browsing information at the interactive display is transferred to the mobile device browser and the user can interact with a mobile IDS from where he left off at the kiosk. For further security, the session key may be invalidated at the end of a predefined interval (e.g., 4 hours).

It is to be understood that the session keys and tags described above are only examples and other formats or identifiers may be used without departing from the scope of the embodiments.

In one embodiment, the content from the interactive display 10 is transferred to the database at the server 16 in an encrypted session. If additional security is needed, an email with a link (e.g., http://<server name>/<hash key>/mobile?=1) may be sent to the user if he has entered an email address. The user can then use the link in the email to continue the interactive experience at his mobile device 20. This will eliminate the need for a QR code.

The session may comprise a multi-party session (e.g., multiple users interact collectively with the interactive display 10 at the same time). In this case, the session tag 19 may be scanned by multiple users, thereby creating a multi-party session between the mobile devices and the server 16.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   generating at a network device comprising a content source in communication with a public interactive digital sign, a unique session tag for an interactive user session between a user of a mobile device and the public interactive digital sign, the user session initiated by the user of the mobile device, wherein the session tag is configured for input at the mobile device;
   assigning a session identifier to said user session and wherein generating the session tag comprises using said session identifier to generate the session tag;
   transmitting the session tag from the network device to the public interactive digital sign for input at the mobile device; and
   continuing at the network device, said user session with the mobile device;
   wherein said session identifier comprises a hash of a timestamp and an interactive digital sign identifier.

2. The method of claim 1 further comprising invalidating said session identifier after a specified period of time.

3. The method of claim 1 wherein the session tag represents a uniform resource identifier.

4. The method of claim 1 wherein the session tag comprises a quick response (QR) code.

5. The method of claim 1 wherein the session tag comprises a near field communication (NFC) tag.

6. The method of claim 1 wherein the session tag is configured for display at the interactive digital sign.

7. The method of claim 1 further comprising starting a timer upon transmitting the session tag to the interactive digital sign and timing out the session tag if no input is received from the mobile device after a specified time interval.

8. The method of claim 1 wherein the session tag is generated upon receiving a request at the network device to transfer said user session to the mobile device.

9. An apparatus comprising:
   a processor for receiving user input at public interactive digital sign in a user session between a user of a mobile device and the public interactive digital sign, transmitting a request to transfer said user session to the mobile device, and receiving a session tag associated with said user session; and
   memory for storing the session tag, wherein the session tag is generated using said session identifier and said session identifier comprises a hash of a timestamp and an interactive digital sign identifier;
   wherein the session tag is configured for input at the mobile device to transfer said user session from the public interactive digital sign and the user of the mobile device to a content source and the mobile device.

10. The apparatus of claim 9 wherein the session tag represents a uniform resource identifier.

11. The apparatus of claim 9 wherein the processor is further operable to end said user session if no input is received at the interactive digital sign in a specified period of time or a request to end said user session is received.

12. The apparatus of claim 9 wherein the processor is further operable to display the session tag at the interactive digital sign.

13. The apparatus of claim 9 wherein the session tag comprises a quick response (QR) code.

14. The apparatus of claim 9 wherein the session tag comprises a near field communication (NFC) tag.

15. A method comprising:
   receiving a session tag at a mobile device, the session tag available from a public interactive digital sign and identifying a user session between a user of the mobile device and the public interactive digital sign;
   contacting a server providing content to the public interactive digital sign at the mobile device using the session tag; and
   continuing at the mobile device, the user session with the server;
   wherein a session identifier is used to generate the session tag, the session identifier comprising a hash of a timestamp and an interactive digital sign identifier.

16. The method of claim 15 wherein receiving the session tag comprises scanning a quick response code.

17. The method of claim 15 wherein the session tag comprises a uniform resource identifier containing a session identifier.

18. The method of claim 1 wherein the session tag comprises a certificate for authenticating the mobile device at the network device.

19. The apparatus of claim 9 wherein the user session comprises a multi-party session.

20. The method of claim 15 wherein the session tag is received in an email from the server based on user input at the interactive digital sign.

* * * * *